United States Patent [19]
Vann et al.

[11] 3,713,334
[45] Jan. 30, 1973

[54] DOWNHOLE RECORDER DEVICE FOR LOGGING BOREHOLES

[76] Inventors: Roy R. Vann; Clyde R. Vann, both of 3302 Providence Drive, Midland, Tex. 79701

[22] Filed: Jan. 25, 1971

[21] Appl. No.: 109,383

[52] U.S. Cl. .................................. 73/152, 166/241
[51] Int. Cl. ............................................. E21b 47/00
[58] Field of Search...346/33 W; 73/152, 151, 151.5; 200/61.58 R; 166/241

[56] References Cited

UNITED STATES PATENTS 3,512,407  5/1970  Zill..........................................73/152
2,944,603  7/1960  Baker et al. .......................166/241 X

*Primary Examiner*—Jerry W. Myracle
*Attorney*—Marcus L. Bates

[57] ABSTRACT

A self contained downhole recording device for use in a method of logging boreholes, which includes logging apparatus electrically connected to a recording means, and further including a power supply and a switch means. The entire apparatus can be lowered into a borehole on a slick line, the switch actuated by manipulation of the slick line, and the structure forming the borehole analyzed by recording magnetic impulses upon the recording device. The apparatus is returned to the surface of the earth and the recording means fed into a strip type recorder device which prints out the magnetic impulses as indicia to thereby form a well log.

9 Claims, 12 Drawing Figures

PATENTED JAN 30 1973

INVENTORS
ROY R. VANN
AND CLYDE R. VANN
BY MARCUS L. BATES
THEIR AGENT

INVENTORS
ROY R. VANN
AND CLYDE R. VANN
BY MARCUS L. BATES
THEIR AGENT

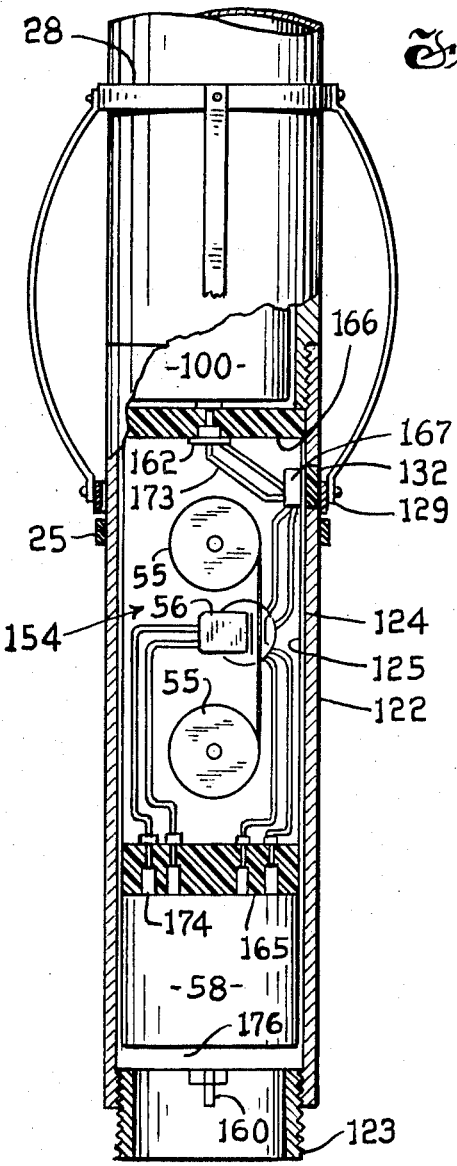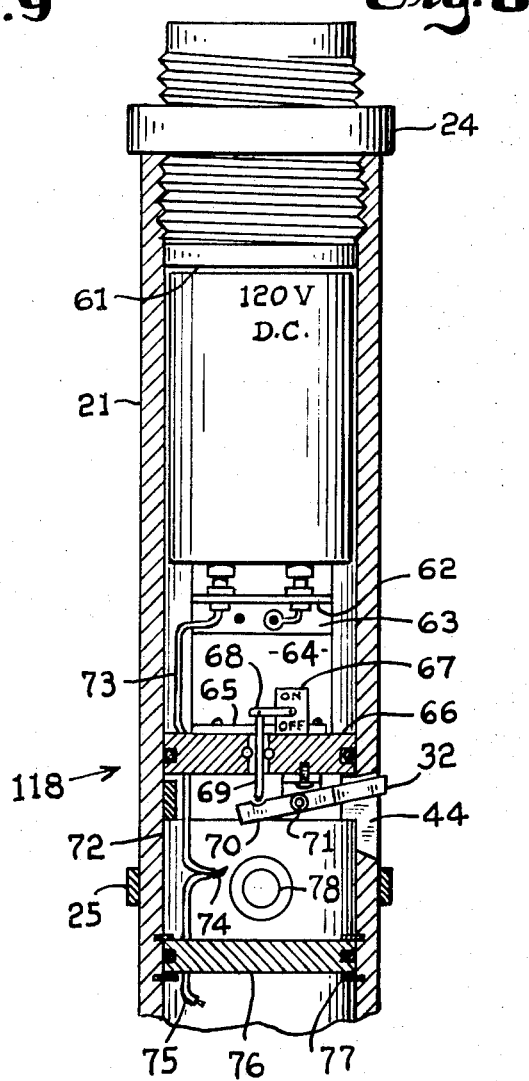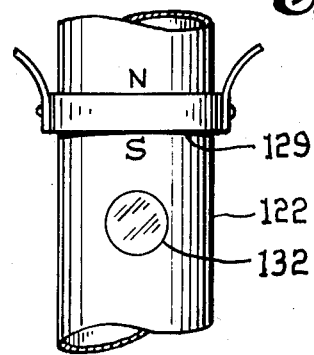

DOWNHOLE RECORDER DEVICE FOR LOGGING BOREHOLES

BACKGROUND OF THE INVENTION

After sinking a borehole into the earth, an "open hole" survey is usually run prior to setting or cementing a casing therein. Should the survey indicate the well is "dry," there is no reason to set the casing and the hole is plugged and abandoned. Preferably, the survey will show indications of "pay," and therefore the well will be cased, at least at the pay zone, and completed at a subsequent date. After completion, if a sufficient quantity of hydrocarbons is available, the well will be connected into a gathering system and considered a profitable producer. Most wells, unfortunately, are plugged and abandoned because they are regarded as being unprofitable producers.

A multitude of information is usually available from the open hole survey of the borehole. However, it is only after having made exhaustive studies and comparisons of the various open hole logs that the geologist can determine the probability of the well becoming a good producer.

A borehole may contain several different spaced apart hydrocarbon producing formations. Accordingly, the potential producer will generally be cased only after the geological analysis of the open hole has been carried out so as to enable the casing to be cemented into place in the most optimum position and manner.

Completion of the well requires perforation of the casing, cement, and formation wherein communication is established between the well bore and the hydrocarbon producing formation at one or more precise vertical elevations within the borehole. An error of only a few inches in placement of the perforations will sometime result in marginal production as compared to profitable production.

After the casing is set, it has heretofore been customary for the wire line apparatus to return to the borehole and run a second survey in order to index the casing collars with the previously obtained open hole survey. After the casing collars are indexed, the perforating crew employs a collar locater in conjunction with a jet perforating gun to precisely locate each of the jet charges relative to a formation and to the nearest adjacent collar. Such an expedient is well known to those skilled in the art.

Accordingly, the ability to index casing collars with a production formation without the added expense of employing a wire line crew and expensive logging apparatus for a second survey is desirable. It is also desirable to be able to utilize all of the original open hole data by indexing the open hole log with the casing collars to thereby enable the borehole to be perforated at the most optimum elevation thereof, by subsequently employing a casing collar locator together with the jet gun.

SUMMARY OF THE INVENTION

This invention comprehends both method and apparatus for logging a borehole with a slick line. The method comprises encapsulating a recording device and logging apparatus so as to enable the recording device to store electrical impulses received from the logging apparatus as the borehole is logged. The apparatus includes means responsive to movement between a housing and the borehole wall for activating the recording apparatus. This enables the recorder to be activated at a precise location downhole within the borehole, the apparatus is retrieved uphole at a constant velocity while a gamma ray and collar locator simultaneously feed signals into the recorder; and at the same time an above ground depthometer collaborates the position of the casing collars.

The stored signals from the recorder are transposed to a chart to thereby provide a gamma ray log which is exactly indexed with respect to the collars of the well bore.

The gamma ray log can now be indexed with any of the previously obtained open hole data. Therefore, a simple slick line apparatus can be employed to precisely index all of the accumulated open hole data with the vertical location of various formations within the borehole. This expedient avoids the previous necessity and expense of duplicating at least a portion of the open hole survey so that a geologist can accurately perforate the casing adjacent to any pay zone discovered from studying the original data.

It is therefore a primary object of this invention to provide a means by which an open hole log can be precisely indexed relative to the casing collars of a casing which is subsequently cemented into a borehole.

Another object of this invention is the provision of apparatus which can be run into a cased borehole on a slick line to locate the collars relative to the gamma ray survey.

A further object of this invention is the provision of apparatus for surveying a borehole which can be run into the borehole on a slick line.

A still further object of this invention is the provision of method and apparatus which makes possible the subsequent utilization of open hole data in a cased borehole.

The above objects are attained in accordance with the present invention by employing the method in conjunction with the apparatus substantially as described in the above abstract and summary.

These and other objects and advantages of this invention will become readily apparent to those skilled in the art upon reading the following detailed description and by referring to the accompanying drawings and claims.

BRIEF DESCRIPTION OF THE DRAWINGS

FIG. 8 is a fragmentary, longitudinal, cross-sectional representation of a modification of the embodiment of FIG. 5;

FIG. 9 is similar to FIGS. 5 and 8, and sets forth still another embodiment of the invention; and FIG. 10 is a fragmentary side elevational view showing a portion of the apparatus disclosed in FIG. 9.

DETAILED DESCRIPTION OF THE PREFERRED EMBODIMENTS

Figure 1:
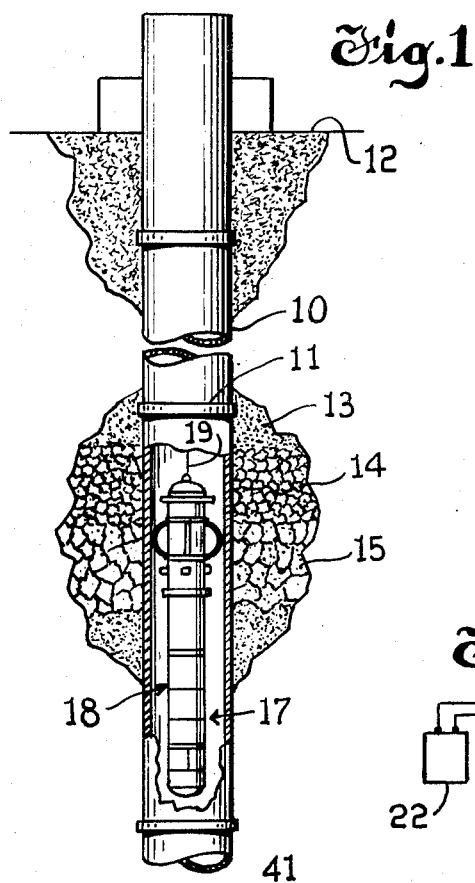
FIG. 1 is a cross-sectional view of a portion of the earth's strata, schematically showing a borehole within which is disposed apparatus, some of which is made in accordance with the present invention.

In the drawings, wherever possible, like numerals refer to and identify like or similar elements.

FIG. 1 illustrates a borehole which has been formed downwardly into the ground. The borehole is provided with a casing 10, made up of multiple joints of pipe fastened together by a fastener means as exemplified by the collar 11. The borehole extends from the surface 12 of the ground through various geological formations 13, 14, and 15. Disposed within the interior 17 of the casing, although it could equally well be disposed within production tubing, there is seen apparatus 18 which enables the present method to be practiced. The apparatus is suspended by a support means 19 which for purpose of illustration, is shown in the form of a slick line.

Figure 2:
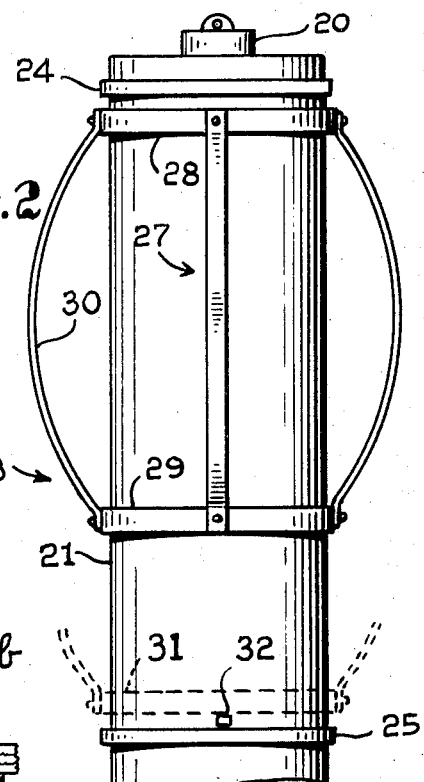
FIG. 2 is an enlarged, fragmentary, part cross-sectional representation of some of the apparatus disposed in the borehole of FIG. 1.

As disclosed in FIG. 2, apparatus 18 includes a swivel 20 axially disposed with respect to the main housing. The main housing preferably is made up of a plurality of series connected longitudinally extending sections 21, 22, and 23.

Spaced apart circumferentially extending stop means 24 and 25 preferably are disposed above circumferentially extending member 26 to thereby position member 27 at the upper extremity of the package, and member 26 at the lower or trailing end of the package.

Member 27 includes spaced apart circumferentially extending rings 28, 29 which are connected together by a multiplicity of circumferentially disposed radially spaced apart bows 30 which are outwardly directed in a manner to engage the interior wall of the casing. The rings are fabricated with an internal diameter of a size to permit slidable reciprocating movement along the upper section between the limits of the stop members. Those skilled in the art will recognize that member 27 is in the general form of a casing centralizer and will realize that ring 29 can be reciprocated from its illustrated position into the dot-dash position seen in phantom at 31 in FIG. 2. Switch means 32 can take on several different forms so long as an element thereof is movable to one of its alternate positions in response to movement of ring member 29. That is, ring member 29 can move the switch from a current flow permitting to a current flow preventing position, and vice versa.

Looking again to the details of member 26, there is seen several collar engaging members 33 and 34 which are radially spaced apart and circumferentially disposed about the exterior body. Each member has a free end portion and a fixed end portion, with the fixed end portion being rigidly affixed to ring 26. Each of the members extend downwardly and outwardly, where a marginal portion thereof receives a reverse bend so that the terminal end thereof is received within the illustrated cavity 35 formed between adjacent joints of casing or within the casing connector means.

Figure 3:
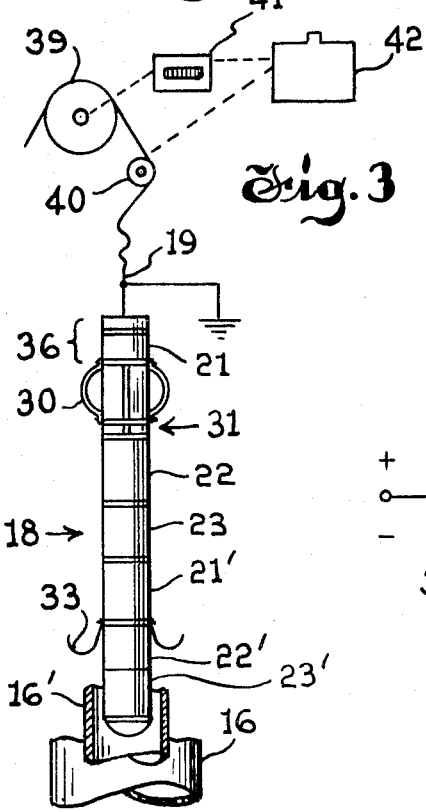
FIG. 3 is a schematical representation illustrating one function of the present invention.

FIG. 3 illustrates that the main housing can be provided with additional sections 21', 22', and 23'; and, as previously stated, the apparatus may be disposed within production tubing 16' as well as within the before mentioned casing 16. A pulley 39 supports the apparatus, with strain gauge 40 being interposed immediately thereunder. Depth gauge 41 is calibrated with respect to pulley 39 and places indicia on a chart 42 in a manner which is directly proportional to the distance that the apparatus is located downhole. Strain gauge 40 measures the weight of the apparatus and places indicia on the chart relative to the weight as the chart is scribed at 42.

Figure 4B:
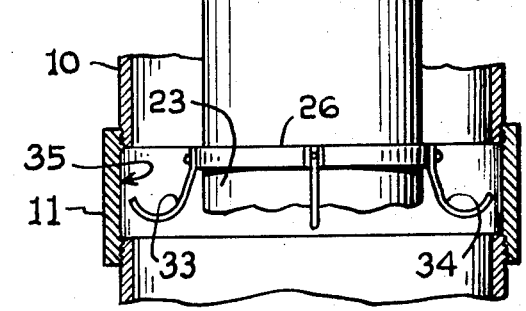
FIG. 4b is a diagrammatical representation of a teaching of the present invention.
Figure 4A:
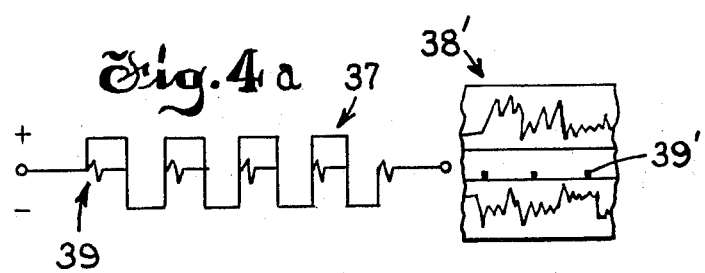
FIG. 4a schematically illustrates a teaching of this invention.

FIG. 4a shows a square wave form 37 which prints out the curve at 38', while the negative side of the wave form prints out the opposite curve. The collar locator associated with the apparatus 18 provides signal 39 which is printed on the chart as 39'.

FIG. 4b schematically sets forth a recorder device 22 having stored knowledge therein which may be in the form of magnetic or electrical impulses such as a tape recorder. The recorder is fed into a transducer at 37 which converts the electrical or magnetic signals at 22 into a permanent log or chart 38.

Figure 5:
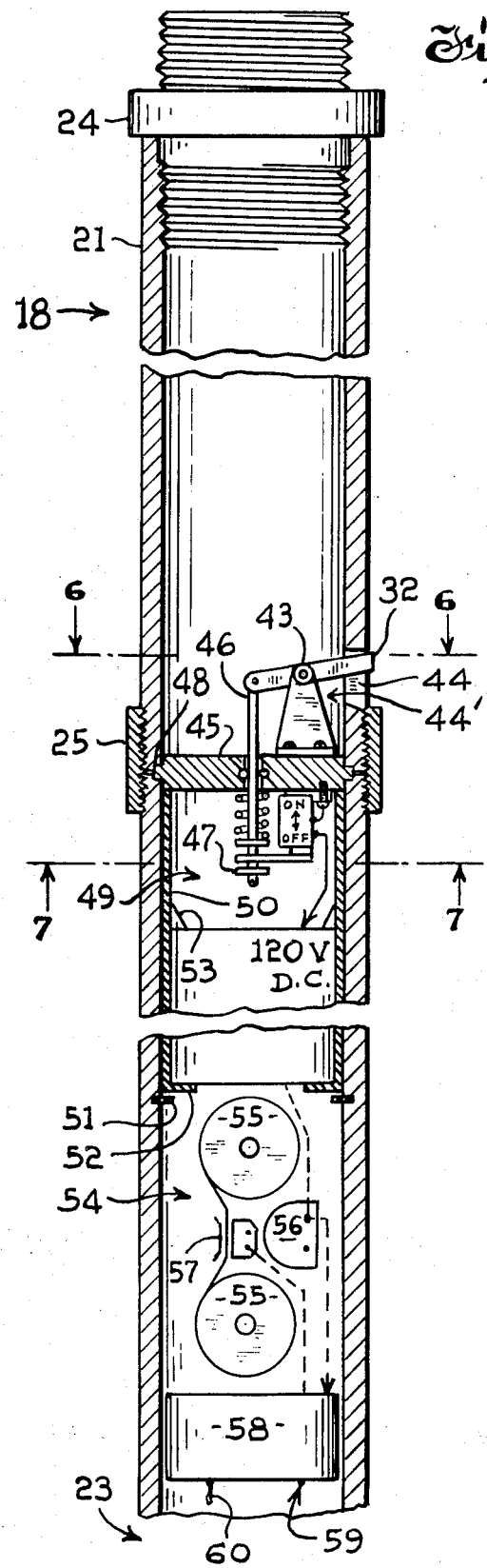
FIG. 5 is a fragmentary, longitudinal, cross-sectional view of part of the apparatus disclosed in FIG. 2.
Figure 6:
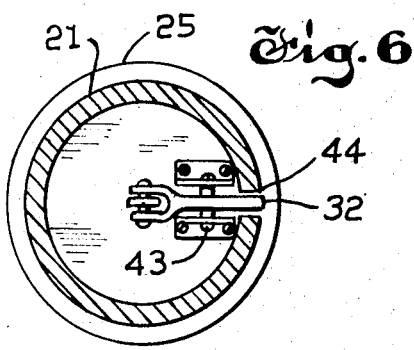
FIGS. 6 and 7, respectively, are cross-sectional views taken along line 6—6 and 7—7, respectively, of FIG. 5.
Figure 7:
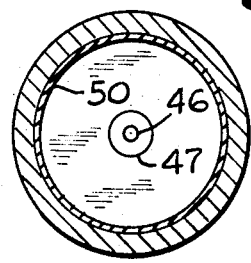
Figure 4C:
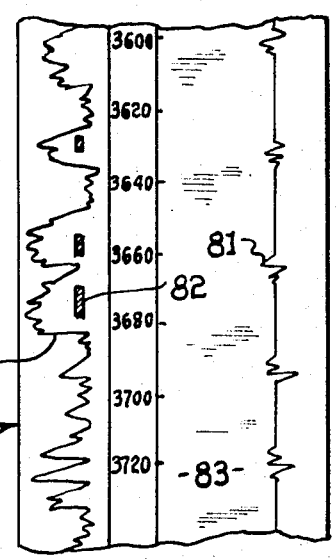
FIG. 4c is also a diagrammatical representation of a teaching of the present invention.

As seen in FIG. 5, in conjunction with FIGS. 6 and 7, the switch actuator 27 has been removed from section 21 to more clearly disclose the invention. Stop means 25 forms a connector by which section 21 is joined to section 22. Switch actuator 32 has a marginal end portion thereof extending outwardly through section 21 an amount slightly less than the o.d. of the stop members.

The switch actuator lever is journaled at 43 and rigidly positioned by the spaced apart legs generally indicated by the numeral 44'. Slot 44 receives the marginal end portion of the lever therethrough and is of sufficient longitudinal length to enable manipulation of the lever. Bulkhead 45 has a central bore formed therethrough for sealingly and reciprocatingly receiving shaft 46 therethrough. Spaced apart members 47 capture a depending arm of the illustrated switch therebetween for actuating the switch between the two illustrated switch positions. The bulkhead is reduced in thickness at 48 to form opposed shoulders which abuttingly receive the end portions of sections 21 and 22 thereagainst.

A battery in chamber 49 is removably affixed within the interior of section 22 by means of insulation 50 together with the cooperative action of the circumferentially extending snap ring 51. The lower extremity of the insulation is inwardly turned at 52 so as to bottom support and maintain the storage battery urged against the upper member 53.

A device for storing information, broadly illustrated by the arrow at numeral 54, is in the form of a magnetic tape recorder having spaced apart tape receiving reels 55 disposed on either side of a magnetic pick-up head. The recorder further includes tape guide means 57 and motor 56 which receives current from the battery when the switch is moved to one of its two alternate positions by actuation of lever 32.

Circuitry 58 receives signals at terminals 59 and 60 and, after proper treatment of the signals, feeds the resulting signals into the recorder head. The recorded signal can be representative of the signal received from a collar locator, gamma ray, acoustical device, or other well logging expedients known to those skilled in the art.

Looking now to the details of FIG. 8, the battery and switch arrangement is seen to have been reversed with respect to the bulkhead 66 as compared to the configuration seen in the embodiment of FIG. 5. Stop member 24 is in the form of a sub having an interiorly located face 61 which bears against a removable package having a power connection 62 connected to base plate 63. Base plate 64 has a vertically turned wall 65 which is rigidly affixed to a bulkhead member 66, with the last member having the illustrated circumferentially extending seal means associated therewith. The entire package along with bulkhead 66 can be telescopingly withdrawn by sliding it from its housing. Switch 67 is journaled at 68 to shaft 69. The shaft sealingly extends through the illustrated central passageway of the bulkhead. Lever 70 is journaled at 71 to the bulkhead and includes a free end portion 32 extending through longitudinally disposed slot 44 of the housing.

Circumferentially extending stop member 72 abuttingly receives bulkhead 66 thereagainst. Conductor 73 is insulated and sealingly passes through bulkhead 66 so as to enable the connection at 74 to be effected. The conductor continues at 75 through the bulkhead 76. Spaced apart snap rings 77 maintain bulkhead 76 properly disposed within its housing. Inspection port 78 enables the connection at 74 to be properly insulated whereby it is hermatically sealed from well fluids.

Looking now to the embodiments of FIGS. 9 and 10, the recording device 154 is seen to be disposed in a hermatically sealed chamber located below power source 100. Ring member 129 has magnetic material disposed thereon or made integrally therewith which is of a sufficient strength to actuate a magnetically actuated switch 167 through a magnetic flux window 132.

Connector 160 is electrically connected to a collar locator, gamma ray, or other logging apparatus so as to enable the signals received therefrom to be electrically converted by circuitry 58 into a form which can be suitably recorded or stored by the recorder 154. Power to the recorder and other circuitry is conducted by means of connector 162, conductors 173, and connectors 174.

OPERATION

In operation the logging and recording device is lowered into the borehole by means of the slick line. As the recorder desends into the well, the switch actuating mechanism is forced against the upper stop for the reason that each of the bows slidably engage the inside peripheral wall surface of the borehole, thereby reciprocating the actuator to its upper limit of travel.

Upon desending below the strata to be logged, the apparatus is lifted vertically upward by means of the slick line. The switch actuator reciprocates to its lowermost position where it abuts the lower stop member 25, thereby actuating the switch 32, whereupon the gamma ray, collar locator, and any other downhole logging equipment associated therewith is energized. The tool must be lifted at a constant rate of travel while the recorder stores the electrical signals received from the transducer. At the same time, the recorder is being driven at a rate which is proportional to the speed of rotation of the pulley 39, with the weight measuring means 40 being inscribed upon the log 42.

Upon reaching the surface of the ground, the data stored on tape 55 is converted into a log 38 by means of apparatus 22 and 37, the latter of which can take on several different forms so long as the completed log is representative of the signals previously received at 59, 60.

Where deemed desirable, the chart received at 42 is re-run as chart 38 to thereby superimpose the signal from the tape upon the previously run chart of the weight measuring means. This provides a double check against the location of the collar depth.

Assuming that an open hole log indicates a hydrocarbon producing formation at 80, and that this leads the geologist to believe that it would be desirable to perforate in the several areas indicated at 82. Since the open hole log has no dependable depth measurements logged thereon, but the gamma ray curve obtained with the present tool does have the collars exactly located therein, it follows that the gamma ray curves can be indexed together by a simple comparison so as to precisely locate the distance downhole with respect to a specific collar at which the perforations are to be made. This is possible because the original gamma ray curve of the open hole log will maintain its wave or characteristics when logged at a subsequent date through the casing. Accordingly, both of the gamma ray wave forms are compared so as to index the gamma ray curve measured with the present tool with the gamma ray curve measured by the open hole log thereby enabling indexing all of the previous open hole data with the collars of the casing. This heretofore unknown expedient enables one to enter the well with a jet perforating gun, using means such as a collar locator, in order to find a predetermined collar, then lowering or raising the jet gun tool a specific distance relative to a specific collar, so as to perforate the casing at the precise depth at which the pay is expected.

In the embodiment of FIGS. 9 and 10, the tool is hermetically sealed by employment of a window 132 which permits magnetic flux to pass therethrough. Such a window can be any material through which magnetic flux can pass, such as for example, plexiglass, polyethylene, and other plastic or silica compositions known to those skilled in the art. The ring 129 is preferably provided with a magnet at each extremity thereof so as to set up a north and south magnetic polarity as indicated in FIG. 10. When the south pole passes over window 132, the magnetically actuated switch 167 is moved to the "on" position, thereby forming a current flow path from power source 100 to the recorder device, to the transducer 58, and to the various logging apparatus located below the recorder.

I claim:

1. Method of logging a cased borehole wherein a logging tool and a recorder device are connected together and placed within a probe with the probe being supported on a slick-line and moved through the borehole, comprising the steps of:
    1. moving the probe through the borehole at a constant rate of travel by controlling the speed of the slick-line from the surface of the earth;
    2. continuously detecting radiation emitted from formations adjacent to the traveling probe;
    3. producing a radioactive logging signal which is proportional to the radiation detected in step (2);

4. recording the logging signal of step (3) on the recorder located within the probe;
5. simultaneously detecting and recording the presence of collars located within the borehole while carrying out step (1) so that the collars can be used to subsequently index the signal of step (4) with borehole elevation;
6. removing the probe from the borehole;
7. changing the recorded signal of step (4) into a visually observable log by correlating therewith the speed of the slick-line of step (1) and the location of the collars of step (5).

2. The method of claim 1, and further including the step of:
8. correlating the log obtained in step (7) with an open hole log of the borehole so as to index the open hole log with the collars of the cased borehole.

3. The method of claim 1 wherein step (5) is carried out according to the following steps:
5a. changing the tension in the slick-line by releasably engaging the collars of the borehole with the probe;
5b. continuously measuring the tension in the slick-line;
5c. using the increased tension in the slick-line as a signal which indicates the presence of a collar.

4. The method of claim 3 and further including the step of:
8. correlating the log obtained in step (7) with an open hole log of the borehole so as to index the open hole log with the collars of the cased borehole.

5. The method of claim 1 wherein the probe is lowered to the bottom of the hole and the recorder is energized upon the probe being moved uphole.

6. The method of claim 1 wherein the probe is lowered to the bottom of the hole and the recorder is energized upon the probe being moved uphole.

7. A downhole logging apparatus for analyzing structure forming a borehole comprising:

a recorder means for recording electrical signals, a measuring means for measuring the characteristics of the earths strata through which the borehole extends; a source of power; a switch means which can be moved from one position to another position; means forming a housing within which said recorder means, said measuring means, and said power source are hermetically sealed;

support means, including a slick-line, for supporting said housing from within the borehole;

circuit means connecting together said source of power; said switch means, said recorder means and said measuring means; said switch means being connected to cause said recorder means to record signals generated by said measuring means when moved to one position, and to prevent said recorder means from recording signals when moved to another position;

switch actuated means; said switch actuating means including a drag means reciprocatingly captured on said housing and adapted to engage a side wall of the borehole; means connected to said drag means for causing said switch means to move from said one position to said another position in response to reciprocal movement of said drag means.

8. The apparatus of claim 6, wherein said drag means includes a centralizer, a magnet means connected to said centralizer; said switch means being magnetically actuated; whereby, when said magnet means of said centralizer is reciprocatingly moved into close proximity of said magnetically actuated switch means, said switch means is moved from said another position to said one position.

9. The apparatus of claim 8, wherein said switch means is located within said housing, means forming a window in said housing, said window being of a material which permits magnetic lines of flux to pass therethrough; and said magnet means being separated from said switch means by said window.

* * * * *